3,072,235
FRICTION PLATE CLUTCH
George R. Aschauer, Racine, Wis., assignor to Twin Disc Clutch Company, Racine, Wis., a corporation of Wisconsin
Filed Mar. 16, 1959, Ser. No. 799,775
4 Claims. (Cl. 192—99)

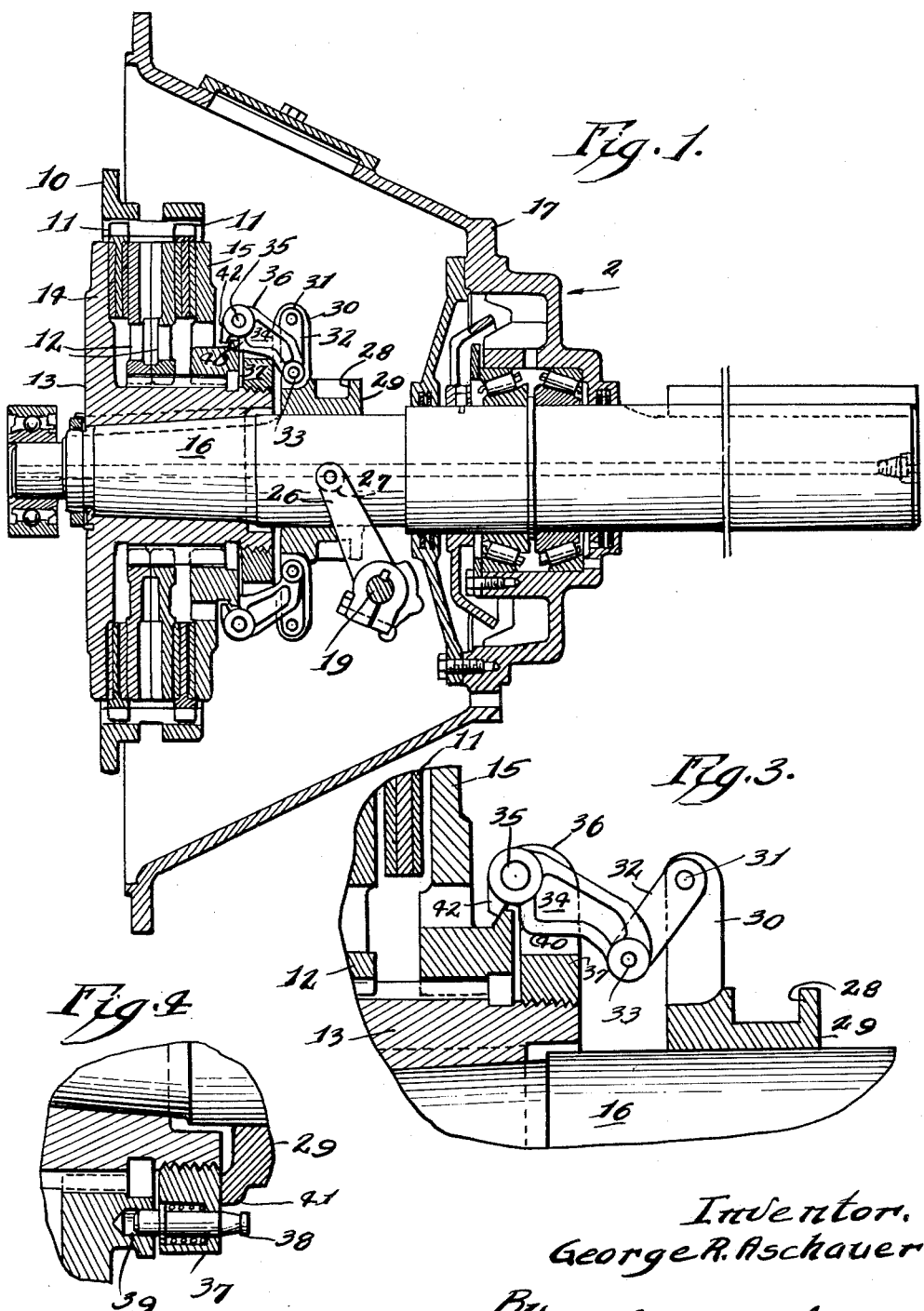

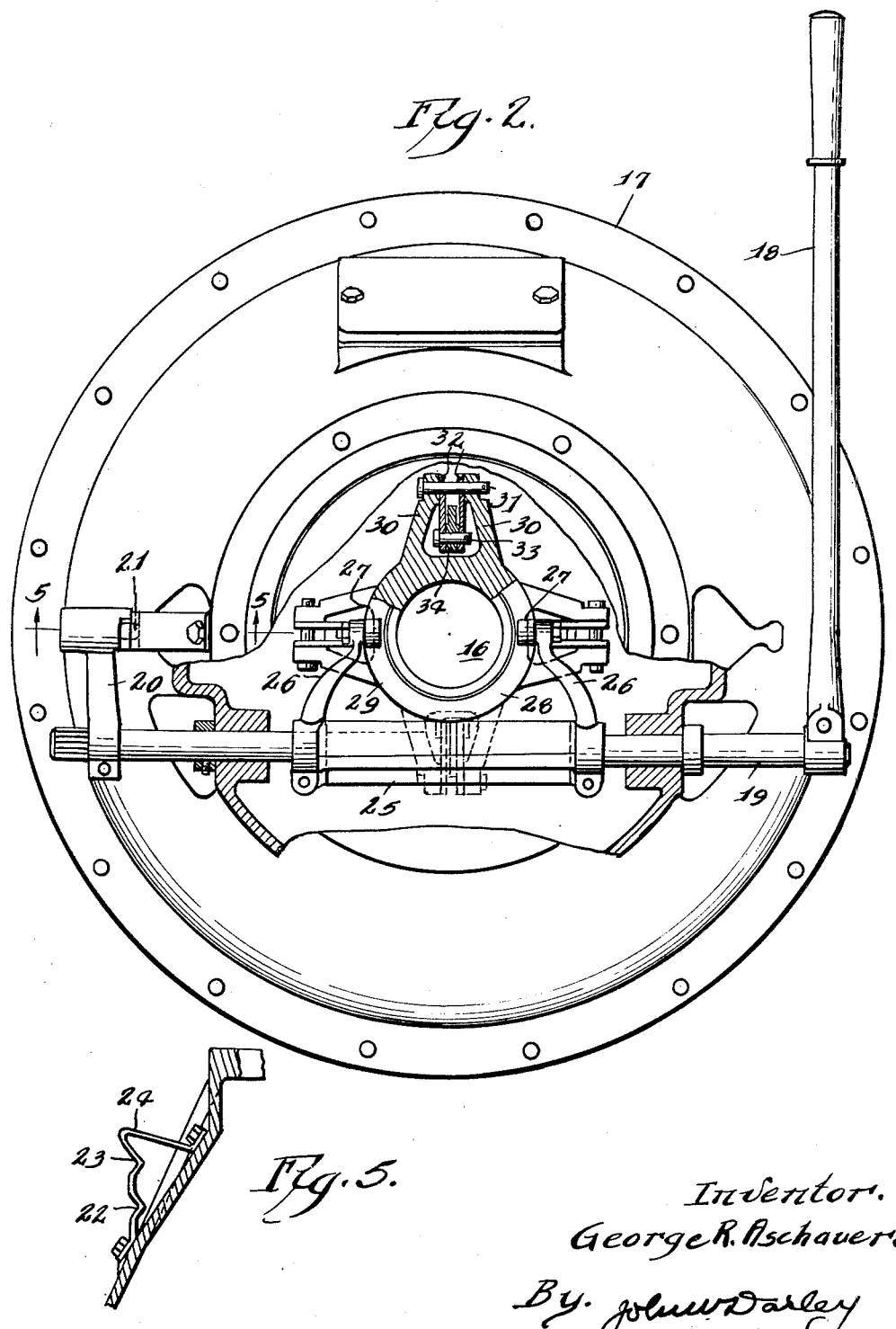

My invention relates to friction plate clutches of the mechanically engageable, high speed type and is concerned primarily with improvements in the actuating mechanism.

One object of the invention is to provide a friction clutch of the type indicated in which the actuating mechanism is characterized by light weight and a consequent reduction in centrifugal forces acting thereon.

A further object is to provide a clutch as above in which the actuating mechanism does not set up any centrifugal stresses in the pressure plate of the clutch, is self-releasing when once started in a disengaging direction, and is self-locking in the engaged position.

These and further objects of the invention will be set forth in the following specification, reference being had to the accompanying drawings, and the novel means by which the objects are effectuated will be definitely pointed out in the claims.

In the drawings:

FIG. 1 is a sectional elevation of the improved clutch in engaged position.

FIG. 2 is an end view of the clutch, partly in section, looking in the direction of the arrow 2 in FIG. 1.

FIG. 3 is an enlarged, fragmentary section as viewed in FIG. 1 showing the actuating mechanism in release position.

FIG. 4 is a fragmentary section of FIG. 1 taken along a different diameter thereof and showing the contact relation between the adjusting ring and one of the lugs on the actuating collar which determines the self-locked position of the latter in engaged position.

FIG. 5 is a section along the line 5—5 in FIG. 2 showing the detent locator for holding the clutch hand lever in engaged or released position.

Referring to FIG. 1, the numeral 10 designates an annular, internally toothed, driving ring which is connectable in any convenient way to a power source (not shown). A pair of spaced, clutch driving plates 11—11 are peripherally toothed for driven and axially slidable connection with the driving ring 10 and are positioned in straddle relation to juxtaposed clutch driven plates 12—12 which are internally toothed for driving and axially slidable connection with a splined hub 13. The hub 13 is preferably integrally formed with a back plate 14 against which the stack of clutch plates 11—11 and 12—12 are gripped during engagement by a pressure plate 15 which also has toothed connection with the splined hub 13. The hub 13 is keyed to an output shaft 16 which is appropriately journaled in and extends through a housing 17 for connection with a load.

The clutch is manually engaged and released by the following instrumentalities. A handle 18 (see FIG. 2) is secured to one end of a cross shaft 19 which is suitably journaled in and extends transversely of the housing 17 beneath the output shaft 16 and its opposite end is connected with a rock arm 20. The opposite end of this arm carries a conventional, biased and slidable, detent pin 21 which is selectively seatable in an engaging notch 22 (see FIG. 5) or in a releasing notch 23 provided in a suitably shaped strip 24 whose ends are attached to the exterior of the housing 17 and otherwise spaced therefrom.

Still referring to FIG. 2, a yoke 25 is secured to an intermediate part of the cross shaft 19 and includes a pair of arms 26—26 whose outer ends are spaced to lie on opposite sides of the shaft 16, respectively, and each such end carries a roller 27 operable in an annular channel 28 provided around a collar 29 axially shiftable on the shaft 16.

The collar 29 carries a plurality of pairs of spaced arms 30—30 (see FIGS 1 and 2) extending outwardly therefrom and at the end thereof which is adjacent the hub 13, four such pairs being shown by way of example and equi-spaced around the collar 29. Considering one pair of arms 30—30, a pin 31 is bridged therebetween at the outer ends of the arms and pivoted on the pin 31 are the outer ends of spaced links 32—32 which extend generally inward of the clutch and have their inner ends connected by a pin 33 that also extends through the free end of a rock lever 34 positioned between the links 32—32. Each rock lever 34 is pivoted at 35 between a pair of arms 36—36 extending outwardly from an adjusting ring 37 threaded on the hub 13 and held in any adjusted position by a conventional, spring loaded, lock pin 38 (see FIG. 4) which is insertible in any one of a number of pockets 39 in and spaced around the pressure plate 15, only one such pocket being shown.

Considering the operation of the clutch and beginning with the release position shown in FIG. 3, it will be apparent that the collar 29 has been retracted to the indicated position by an appropriate rocking of the cross shaft 19. In the release position, the clutch plates 11 and 12 and the pressure plate 15 have been moved free and as permitted by an axial shift of the pressure plate 15 to the right as viewed in FIG. 1 which is effected by means presently described.

To engage the clutch, the cross shaft 19 is rocked in the opposite direction to thereby move the collar 29 towards the hub 13. During this action and considering one actuating mechanism, the pin 31 moves at a constant radial distance from the axis of the output shaft 16 and effects through the links 32 an inward movement of the pin 33 and hence a clockwise rotation of the lever 34 which engages a shoulder 40 thereof with the pressure plate 15 and accordingly a clamping of the clutch plate stack against the back plate 14. This engaging movement of the collar 29 continues until a plurality of lugs 41 spaced around and carried by the collar, only one lug being shown in FIG. 4, contacts the adjusting ring 37. In this position of the collar 29, the axis of the pin 31 is slightly to the left of the radial plane which includes the axis of the pin 33 as shown in FIG. 1.

Due to this relationship of the pins 31 and 33, the actuating mechanism is locked in the engaged position since the reaction pressure of the pressure plate 15 on the levers 34 forces the lugs 41 more firmly against the adjusting ring 37. This relationship is maintained as the clutch plates wear since the adjusting ring 37 is repositioned to compensate therefor. However, when the actuating mechanism is moved in the release direction, a nose 42 on each lever 34 shifts the pressure plate 15 in the release direction and when the actuating mechanism has moved beyond the locked position, centrifugal force acting on the levers 34 effects an acceleration of the release action and the clutch plates release in the usual manner. The magnitude of this centrifugal force is large enough to insure positive release without spring assistance or necessity for counterbalancing of the levers 34 and is sufficiently low to enable easy manual engagement.

The actuating mechanism is characterized by light weight, especially the lever 34 whose weight may be as low as four ounces. The mechanism therefore does not produce large radial forces due to centrifugal action and, in particular, centrifugal stresses are not set up in the pressure plate by this mechanism. The clutch is therefore designed for high speed operation, a characteristic value being about 3000 r.p.m.

In effect, the linkage between the collar 29 and the adjusting ring 37 is characterized by a bellows-like or toggle action, the links 32 and the levers collapsing towards each other when the clutch is engaged and being extended when the clutch is released and with the pivotal connections of the links 32 and levers 34 lying inwardly of their respective pivotal connections to the collar 29 and the adjusting ring 37.

I claim:

1. A clutch comprising a hub and a rotary part, friction plates respectively connected to the hub and to the rotary part and shiftable between engaged and released positions, a back plate fixed on the hub, a pressure plate for engaging the friction plates against the back plate, and actuating mechanism positioned with the pressure plate between it and the back plate and comprising a collar coaxial with and movable towards and away from the hub, and a plurality of toggle lever means circumferentially spaced around the axis of the clutch, each toggle lever means including a lever and a link respectively pivoted at one end on the hub and collar and having pivotal attachment with each other at their opposite ends, respectively, the pivotal attachment of each lever to the associated link being positioned radially inward of their respective pivotal connections with the hub and collar in engaged and released positions of the clutch, and separate shoulder and nose parts on each lever positioned radially inward of the pivot connection thereof with the hub for respectively shifting the pressure plate to engaged and released positions when the collar is moved towards and away from the hub, the collar having a limiting position in contact with the hub to determine a self-locked condition of the toggle lever means when the clutch is engaged and centrifugal force acting on the toggle lever means effecting an accelerated release of the clutch when the self-locked condition of the toggle lever means is broken.

2. A clutch as defined in claim 1 wherein the collar is provided with circumferentially, equispaced radial arms and said one end of each link is pivotally connected to an associated arm.

3. A clutch as defined in claim 1 wherein an adjusting ring is threaded on the hub and the levers are pivoted on the ring.

4. A clutch as defined in claim 3 wherein the collar includes one or more lugs extending towards and for contacting the adjusting ring when the clutch is engaged.

References Cited in the file of this patent

UNITED STATES PATENTS

| | | |
|---|---|---|
| 681,152 | Thomas | Aug. 20, 1901 |
| 1,431,053 | Smith | Oct. 3, 1922 |
| 1,880,616 | White | Oct. 4, 1932 |
| 2,616,540 | Miller | Nov. 4, 1952 |
| 2,626,032 | De Coursey | Jan. 20, 1953 |
| 2,815,839 | Binder | Dec. 10, 1957 |